(12) United States Patent
Takehi

(10) Patent No.: US 8,488,944 B2
(45) Date of Patent: Jul. 16, 2013

(54) BROADCAST PROGRAM RECORDING APPARATUS AND CONTROL METHOD FOR THE SAME

(75) Inventor: Go Takehi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 12/665,697

(22) PCT Filed: Jun. 24, 2008

(86) PCT No.: PCT/JP2008/061805
§ 371 (c)(1),
(2), (4) Date: Dec. 18, 2009

(87) PCT Pub. No.: WO2009/008276
PCT Pub. Date: Jan. 15, 2009

(65) Prior Publication Data
US 2010/0322590 A1  Dec. 23, 2010

(30) Foreign Application Priority Data
Jul. 6, 2007  (JP) ................................ 2007-178395

(51) Int. Cl.
*H04N 5/76* (2006.01)
(52) U.S. Cl.
USPC ........................................................ 386/291
(58) Field of Classification Search
USPC ................. 386/200, 201, 212, 213, 291, 296, 386/298
See application file for complete search history.

(56) References Cited

U.S. PATENT DOCUMENTS

| | | | |
|---|---|---|---|
| 2005/0183016 A1* | 8/2005 | Horiuchi et al. | 715/719 |
| 2006/0078285 A1* | 4/2006 | Arishima | 386/46 |
| 2006/0120688 A1 | 6/2006 | Uchida | |
| 2006/0129547 A1* | 6/2006 | Yamamoto et al. | 707/5 |
| 2007/0222791 A1* | 9/2007 | Graves et al. | 345/604 |

FOREIGN PATENT DOCUMENTS

| | | |
|---|---|---|
| EP | 1768399 A | 3/2007 |
| JP | 2001-024989 A | 1/2001 |
| JP | 2002-176593 A | 6/2002 |
| JP | 2002-298501 A | 10/2002 |
| JP | 2002-354361 A | 12/2002 |
| JP | 2005-354570 A | 12/2005 |

* cited by examiner

*Primary Examiner* — Tat Chio
(74) *Attorney, Agent, or Firm* — Carter, DeLuca, Farrell & Schmidt LLP

(57) ABSTRACT

In a broadcast program recording apparatus 101 that is capable of recording an event relayed program, each of first and second receiving units 102 and 103 receives digital broadcast signals. A control unit 112 reads out program information stored in a memory 111, and determines whether the program being received by the first receiving unit 102 and recorded on a storage 110 is a relay source program or not. Then, in a case in which the receiving unit 102 is receiving the relay source program, channel selection is carried out so that the second receiving unit 103 receives a relay destination program a certain period of time before the end time of that program.

14 Claims, 17 Drawing Sheets

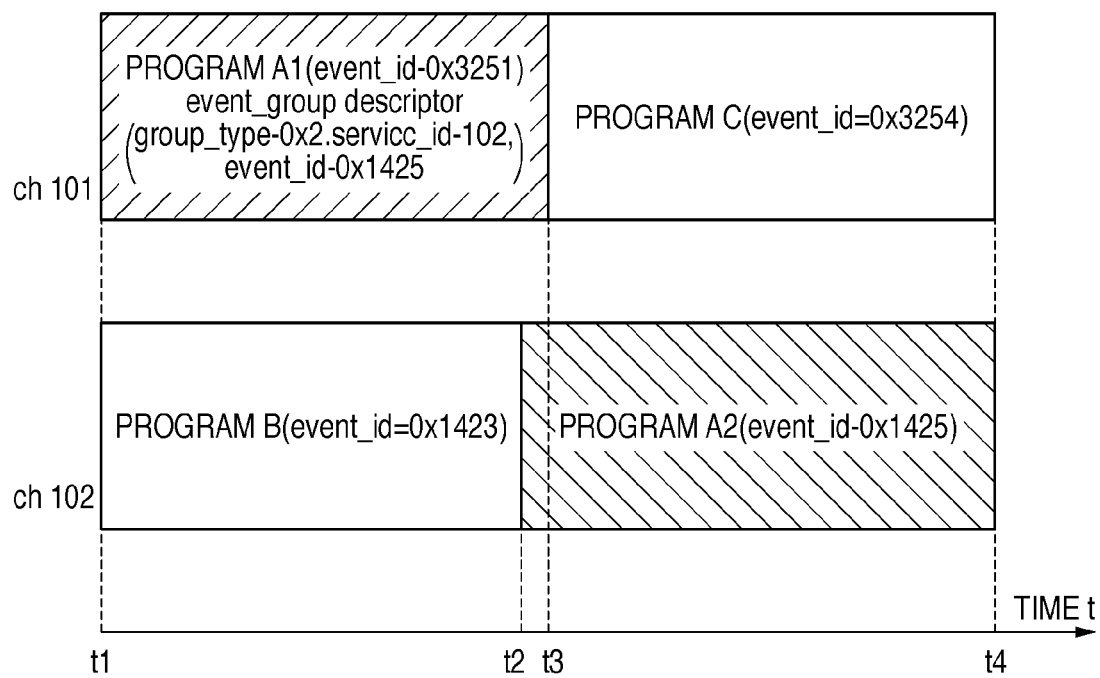
F I G. 2

FIG. 13

| THE NUMBER OF PIXELS | | PROGRAM DETERMINATION REFERENCE VALUE | IMAGE DETERMINATION REFERENCE VALUE |
| --- | --- | --- | --- |
| RELAY SOURCE | RELAY DESTINATION | | |
| 1920x1080 | 1920x1080 | 60% | 90% |
| 720x480 | 720x480 | 55% | 85% |
| 1920x1080 | 720x480 | 50% | 80% |
| 720x480 | 1920x1080 | 50% | 80% |

F I G. 16
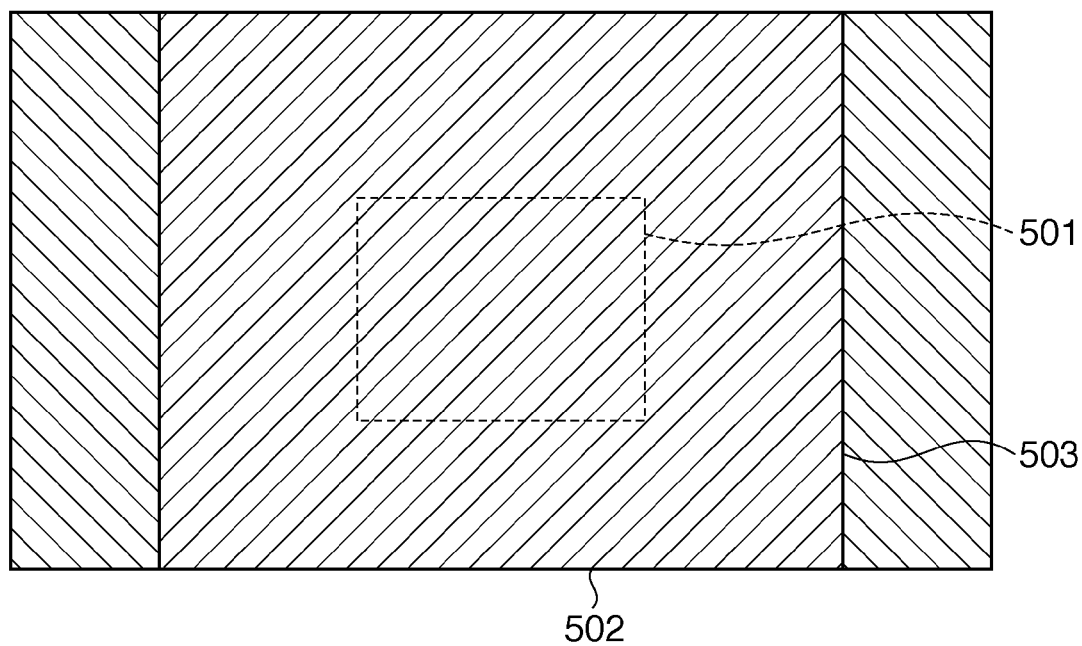

BROADCAST PROGRAM RECORDING APPARATUS AND CONTROL METHOD FOR THE SAME

TECHNICAL FIELD

The present invention relates to a broadcast program recording apparatus that records broadcast program video and a control method for the broadcast program recording apparatus.

BACKGROUND ART

A broadcasting mode in which, in the middle of a broadcast program, the program is relayed to and broadcasted on another channel is referred to as an event relay (program relay). For example, it is often the case that programs which take a long time to broadcast, such as high school baseball games and the Olympic Games, are event relayed. Further, an event relay may be carried out when an emergency broadcast is broken into a program, or when a program is extended and not completed in scheduled broadcast time. Operational regulations on event relays are described in Fascicle 2, Vol. 4, Section 2, Part 24 and Fascicle 3, Vol. 7, Section 8, Part 8.5 of "Operational Guidelines for Digital Terrestrial Television Broadcasting" in ARIB (Association of Radio Industries and Businesses) standards "TR-B14".

Conventionally, in a case in which the channel of a broadcast program being recorded is switched in accordance with an event relay, there is a broadcast program recording apparatus with a function of switching the channel to be recorded automatically following the event relay.

However, the conventional broadcast program recording apparatus has, in a case in which an event relayed broadcast program is to be recorded, a problem in that recording of a portion of the program is missed at the time of switching from a relay source channel to a relay destination channel, due to a delay (time lag) and the like caused by controlling the channel switching with the use of one tuner. Further, depending on the timing of the channel switching, the beginning of the next broadcast program may be recorded.

Conventionally, techniques have been proposed for preventing a period of time for which no continued program can be viewed from being produced in the case of performing a temporary broadcasting service (an event relay) when a broadcast program is being viewed with a time shift (see Japanese Patent Laid-Open No. 2002-354361).

Further, techniques have been proposed in which even if the reception condition of a main broadcast to be recorded deteriorates and makes recording impossible, video of a sub-broadcast in simul broadcast is utilized to produce continuous consistent content in content playback (see Japanese Patent Laid-Open No. 2005-354570).

Furthermore, techniques have been proposed for achieving seamless playback avoiding loss of data without overlap recording of some data on each recording reproduction apparatus in a case in which multiple recording reproduction apparatuses equipped with recording media are used to record continuous data (see Japanese Patent Laid-Open No. 2002-298501).

As described above, the conventional broadcast program recording apparatus has, in a case in which an event relayed broadcast program is to be recorded, a problem in that recording of a portion of the program is missed at the channel switching. Further, depending on the timing of the channel switching, the beginning of another broadcast program (the next program to be broadcasted on the relay source channel) may be recorded.

According to Japanese Patent Laid-Open No. 2002-354361 described above, the event relayed program can be viewed with a time shift. However, Japanese Patent Laid-Open No. 2002-354361 has not solved the problem that recording of a portion of the program is missed at the time of the channel switching in the event relay. Further, Japanese Patent Laid-Open No. 2005-354570 fails to disclose any techniques related to event relays, and is thus unable to solve the above-described problem specific to recording of the event relayed broadcast program.

DISCLOSURE OF INVENTION

Thus, the present invention provides a broadcast program recording apparatus that, when an event relayed broadcast program is recorded, is capable of recording the broadcast program without missing recording of a portion of the broadcast program, and a control method for the broadcast program recording apparatus.

According to one aspect of the present invention, there is provided a broadcast program recoding apparatus comprising: first and second receiving unit for receiving video data of a broadcast program; a storage that is capable of recording video data received by the first and second receiving unit; determination unit for determining whether or not video data being received by the first receiving unit is video data of a relayed program that is composed of a relay source program broadcasted on a first channel and a relay destination program broadcasted on a second channel, and that is broadcasted continuously on the first channel and the second channel; and control unit for exercising control so that video data on the second channel is received by the second receiving unit and recorded on the storage before an end time of the relay source program, in a case in which the determination unit determines that the video data on the first channel is video data of the relayed program when the video data on the first channel is received by the first receiving unit and recorded on the storage.

According to another aspect of the present invention, there is provided a control method for a broadcast program recording apparatus, comprising: a recording step of recording, on a storage, video data on a first channel received by a first receiving unit;

a determination step of determining whether or not video data being received by the first receiving unit is video data of a relayed program that is composed of a relay source program broadcasted on a first channel and a relay destination program broadcasted on a second channel, and that is broadcasted continuously on the first channel and the second channel; and a control step of exercising control so that video data on the second channel is received by the second receiving unit and recorded on the storage before an end time of the relay source program, in a case in which the determination step determines that the video data on the first channel is video data of the relayed program.

Further features of the present invention will become apparent from the following description of exemplary embodiments with reference to the attached drawings.

BRIEF DESCRIPTION OF DRAWINGS

FIG. 2 is a diagram for explaining an event relay;

FIG. 13 is a diagram showing examples of the determination reference value for an image concordance rate used in Embodiment 2 of the present invention;

FIG. 16 is a diagram for explaining the number of pixels being converted by a pixel conversion unit shown in FIG. 15.

BEST MODE FOR CARRYING OUT THE INVENTION

Preferred exemplary embodiments of the present invention will now be described in detail in accordance with the accompanying drawings. In the embodiments below, an event relay provided by the ARIB standards on digital broadcasting in Japan will be described as an example. However, the present invention is not limited to applications to the ARIB standards in Japan. The present invention is applicable to any broadcasting mode in which, in the middle of a broadcast program, the program is relayed to and broadcasted on another channel.

Embodiment 1

Figure 1:
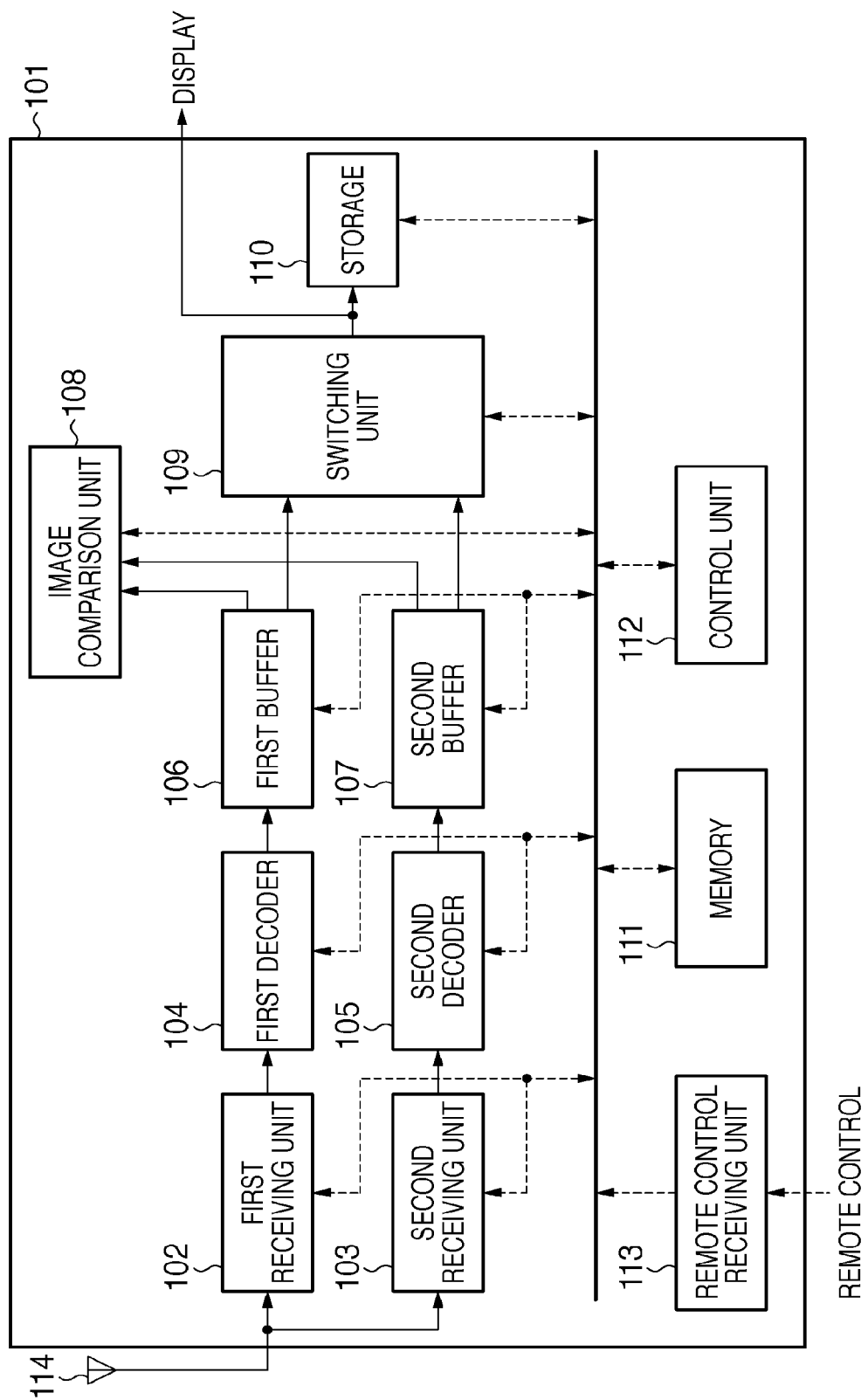
FIG. 1 is a block diagram illustrating a schematic configuration of a broadcast program recording apparatus according to Embodiment 1 of the present invention.

FIG. 1 is a block diagram illustrating a schematic configuration example of a broadcast program recording apparatus 101 according to Embodiment 1 of the present invention.

Each of a first receiving unit 102 and a second receiving unit 103 receives digital broadcast signals input via an antenna 114 or a cable TV line, not shown, subjects the digital broadcast signals to channel selection, demodulation, and error correction processing, and generates a transport stream (TS). Further, each receiving unit separates the generated transport stream into video signals, audio signals, and data signals, and outputs the separated signals.

First and second decoders 104 and 105 decode the video signals and audio signals output from the first and second receiving units 102 and 103, respectively. A first buffer 106 and a second buffer 107 temporarily hold the video data and audio data decoded by the first and second decoders 104 and 105, respectively, and output the data to a switching unit 109. The switching unit 109 selects and outputs either one of the two types of output data from the first and second buffers 106 and 107. A storage 110, which is for example a hard disk, records the video data and audio data output from the switching unit 109. The video data and audio data recorded on the storage 110 is managed on a per-program basis. It is to be noted that the storage 110 may be a hard disk, a recording medium (recorder), or the like externally connected to the broadcast program recording apparatus 101.

It is to be noted that, for simplicity of description and understanding, the term "video data" is used to mean video and/or audio data related to the received broadcast wave in the following description.

The video and/or audio data output from the switching unit 109 is displayed on an externally connected display (not shown). However, the broadcast program recording apparatus 101 may be configured to be integrated with a display.

A control unit 112 acquires program information from the data signals output from the first and second receiving units 102 and 103, and stores the program information in a memory 111. The program information stored in the memory 111 contains an event information table (EIT: Event Information Table) in which event (program) identification (event_id), start time (start_time), program duration (duration), and the like are described. In addition, the event information table contains an event group descriptor (event_group_descriptor) in which information regarding the event (program) is described. In this even group descriptor, the group type (group_type), service identification (service_id), event identification (event_id), and the like are described. The group type refers to an event type such as "0x1 (event sharing)" or "0x2 (event relay)". The service identification refers to service (channel: ch) associated with the event. The event identification refers to a value for identifying the event.

FIG. 2 is a diagram for explaining an event relay. At the time when it is determined that the event is to be broadcasted as an event relay, the broadcaster places an event group descriptor in the event information table of the event (relay source program). For example, the group type (group_type=0x2 (event relay)) of the program A1, and the service identification (service_id=102) of a relay destination program A2 and event identification (event_id=0x1425) are described in the event group descriptor (event_group_descriptor) of the program A1 (event_id=0x3251). The event relayed program is, in this way, composed of the relay source program A1 and the relay destination program, which are broadcasted on different channels.

It is to be noted that although event relay refers to broadcasting the same program (content) on a different channel in the middle of the program, as a matter of convenience, in the following description, a portion of the event relayed program broadcasted on the channel before switching is referred to as a relay source program, while a portion thereof broadcasted on the channel after switching is referred to as a relay destination program. This is because these portions are treated as separate programs in the broadcasting system even if viewers consider the portions as the same program (content).

As the relay destination program, only one program is described. According to ARIB operational regulations, the broadcaster places the event group descriptor (event_group_descriptor) of the relay source program at least 30 seconds before switching to the relay destination program. In a case in which the event relay is scheduled from the beginning, the event group descriptor (event_group_descriptor) is placed from the start. In addition, the start time of the relay destination program has to correspond to or be before the end time of the relay source program. Typically, as shown in FIG. 2, a start time t2 of the relay destination program A2 is set before an end time t3 of the relay source program (hereinafter, also referred to as a relay source program) A1.

Returning to FIG. 1, a remote control receiving unit 113 receives, depending on user's operation, remote control signals transmitted from a remote control not shown, and transfers the remote control signals to the control unit 112. The control unit 112 controls the broadcast program recording apparatus 101 overall depending on the user's operation. In addition, the control unit 112 exerts total control of the broadcast program recording apparatus 101 regarding the event relay.

Specifically, the control unit 112 reads out the program information stored in the memory 111, and determines whether the program received by the first receiving unit 102 or the second receiving unit 103 and recorded on the storage 110 is the relay source program or not. Then, in a case in which the relay source program is received by one receiving unit (for example, the first receiving unit 102), the control unit 112 controls channel selection a certain period of time before the end time of the program so that the other receiving unit (for example, the second receiving unit 103) receives the relay destination program. In this case, the control unit 112 can calculate the end time by adding the program duration (duration) to the start time (start_time) of the relay source program.

An image comparison unit 108 reads out images from the video data temporarily held in the first and second buffers 106 and 107 in a case in which the program recorded on the storage 110 is the relay source program. Then, the image comparison unit 108 compares the read images, identifies two images that correspond to each other based on the comparison result, and notifies the control unit 112 of information regarding the two identified images. Based on the information provided from the image comparison unit 108, the control unit 112 controls operations of the first and second buffers 106 and 107, the switching unit 109, and the storage 110 so that the relay source program and the relay destination program are recorded seamlessly.

It is to be noted that seamless recording means recording without any loss or overlap of the video of the program. More specifically, the seamless recording allows users to view the video of the program without noticing the channel switching by the event relay.

Figure 3A:
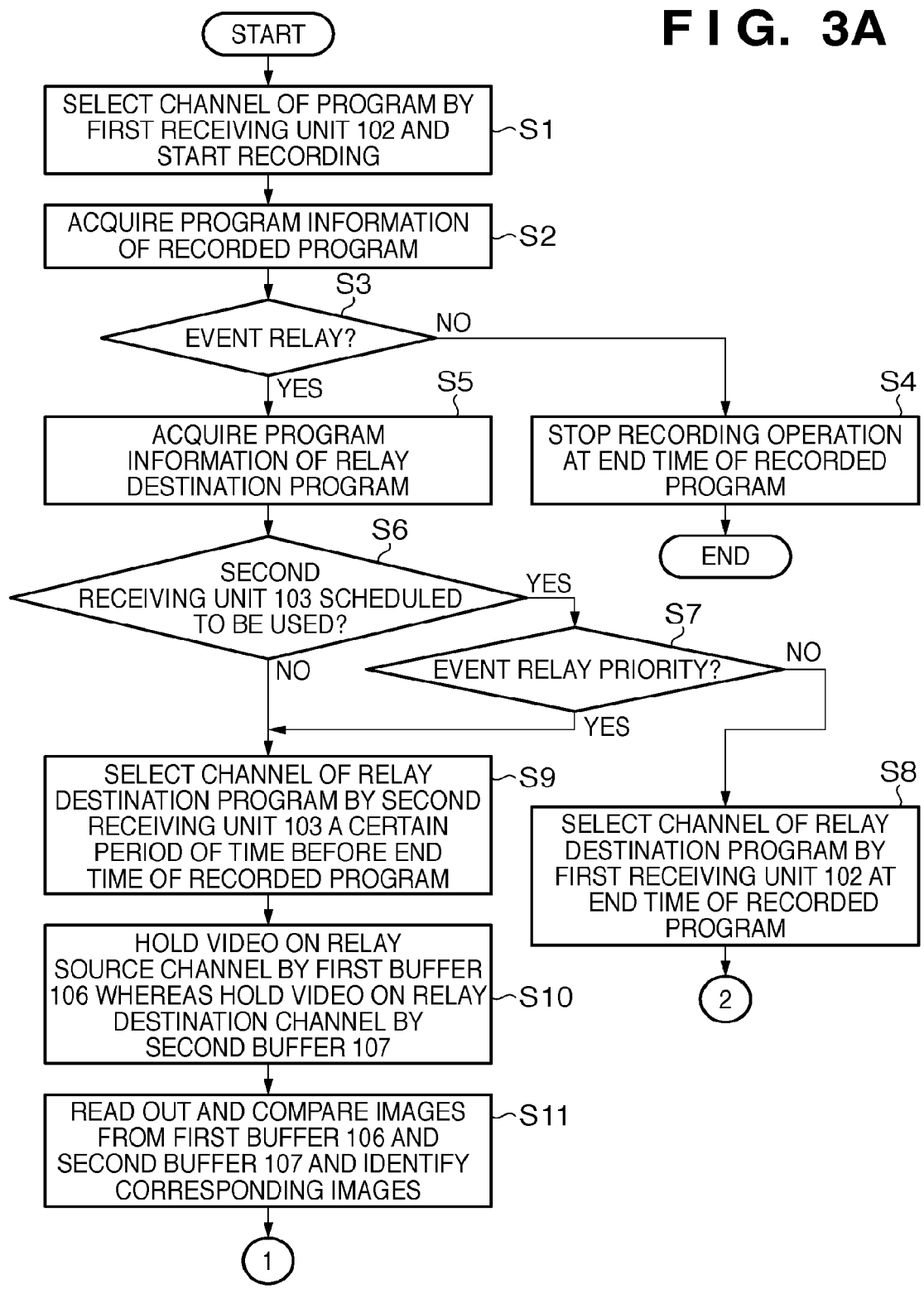
FIGS. 3A and 3B are flow charts for explaining recording operation carried out by the broadcast program recording apparatus shown in FIG. 1.
Figure 3B:
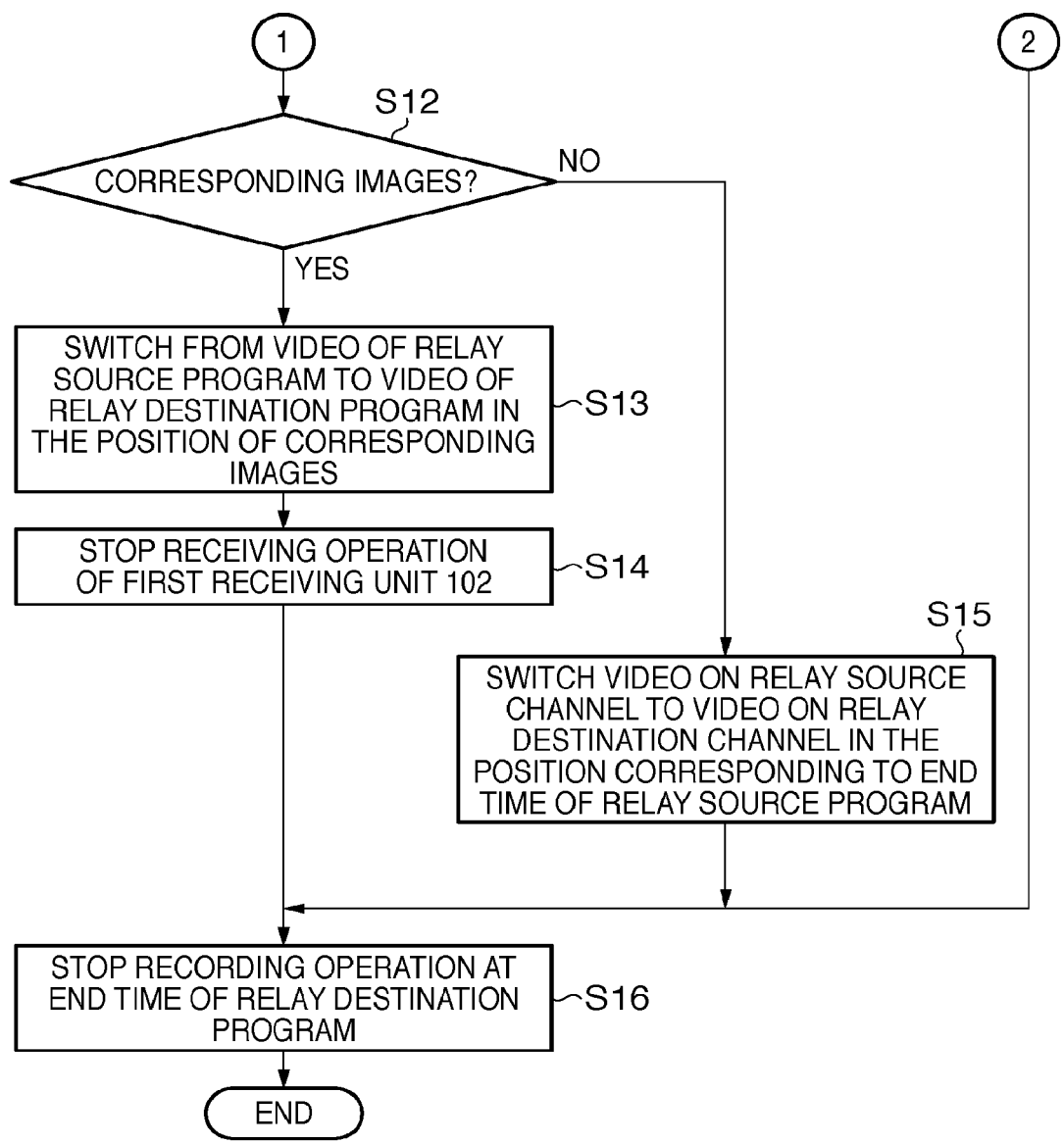

FIGS. 3A and 3B are flow charts for explaining recording operation carried out by the broadcast program recording apparatus 101 shown in FIG. 1. In a case in which user's remote-control operation programs recording of the program or records the program, the control unit 112 reads out program information on the program to be recorded (hereinafter referred to as a recorded program) from the memory 111. Then, the control unit 112 analyzes the invent information table (EIT: Event Information Table) in which the event (program) identification (event_id), start time (start_time), program duration (duration), and the like of the recorded program are described.

In step S1, the control unit 112 controls the first receiving unit 102 based on the program information on the recorded program read out so that the first receiving unit 102 selects the channel of the recorded program at the start time. Then, the control unit 112 starts to record the recorded program selected by the first receiving unit 102 on the storage 110 via the first decoder 104, the first buffer 106, and the switching unit 109. However, at the start of recording, the holding function of the first buffer 106 is turned off, and control is exercised so that the video data and audio data decoded by the first decoder 104 is passed through the first buffer 106 and recorded on the storage 110.

In step S2, the control unit 112 continuously acquires program information on the recorded program from the first receiving unit 102 during broadcasting of the recorded program. Subsequently, in step S3, the control unit 112 analyzes the event information table (EIT) of the recorded program, and determines whether the group type (group_type) described on the event group descriptor (event_group_descriptor) indicates an event relay or not. The broadcaster places the event group descriptor (event_group_descriptor) at least 30 seconds before switching to the event to be relayed. At this point, in a case in which the recorded program is not the relay source program, processing proceeds to step S4 where the recording operation is stopped at the end time of the recorded program. The end time is calculated by adding the program duration (duration) to the start time (start_time). On the other hand, in a case in which the recorded program is the relay source program, processing proceeds to step S5.

In step S5, the control unit 112 acquires program information regarding the relay destination program (hereinafter, also referred to as a relay destination program). Subsequently, in step S6, the control unit 112 determines whether or not the second receiving unit 103 is scheduled to be used for a period before the end time of the relay destination program. For example, in a case in which another program is programmed in parallel to be recorded (or viewed), or in a case in which a user is viewing another program selected by the second receiving unit 103, it is determined that the second receiving unit 103 is scheduled to be used. At this point, in a case in which it is determined that the second receiving unit 103 is scheduled to be used, processing proceeds to step S7, while in a case in which it is determined that the second receiving unit 103 is not scheduled to be used, processing proceeds to step S9.

In step S7, the control unit 112 determines whether an event relay priority mode is set or not. It is assumed that the user can operate the remote control at any time to set the event relay priority mode or an event relay non-priority mode. In step S7, in a case in which it is determined that the event relay priority mode is not set, the processing proceeds to step S8, and the control unit 112 controls the first receiving unit 102 so that the channel of the relay destination program is selected by the first receiving unit 102 at the end time of the recorded program. The operation of controlling channel selection of one receiving unit to switch from the relay source program to the relay destination program in this way is an operation carried out in conventional broadcast program recording apparatuses. Then, in step S16 (FIG. 3B), the control unit 112 stops the recording operation at the end time of the relay destination program. On the other hand, in step S7, in a case in which it is determined that the event relay priority mode is set, the processing proceeds to step S9. However, in the case of the event relay propriety mode, a selection menu may be displayed on a screen so that the user can select either operation of step S7 or step S9.

In step S9, the control unit 112 controls the second receiving unit 103 so that the second receiving unit 103 selects the relay destination program a certain period of time (for example, 5 seconds) before the end time of the relay source program. Next, in step S10, the control unit 112 controls the first buffer 106 and the second buffer 107 so that the first buffer 106 temporarily holds the video and/or audio data on the channel (first channel) of the relay source program whereas the second buffer 107 temporarily holds the video and/or audio data on the channel (second channel) of the relay destination program. However, it is assumed that the first and second buffers 106 and 107 are sufficiently large in capacity to hold images required for image comparison (for example, images for 30 seconds).

Next, in step S11, the control unit 112 controls the image comparison unit 108 so that the image comparison unit 108 carries out operation of image comparison. The image comparison unit 108 reads out and compares the images held in the first and second buffers 106 and 107, and identifies two images that correspond to each other, based on the comparison results. When comparing the two images read out from the first and second buffers 106 and 107, this image comparison unit 108 extracts and compares data of sampling regions near the center of the images, rather than the entire images.

Figure 4:
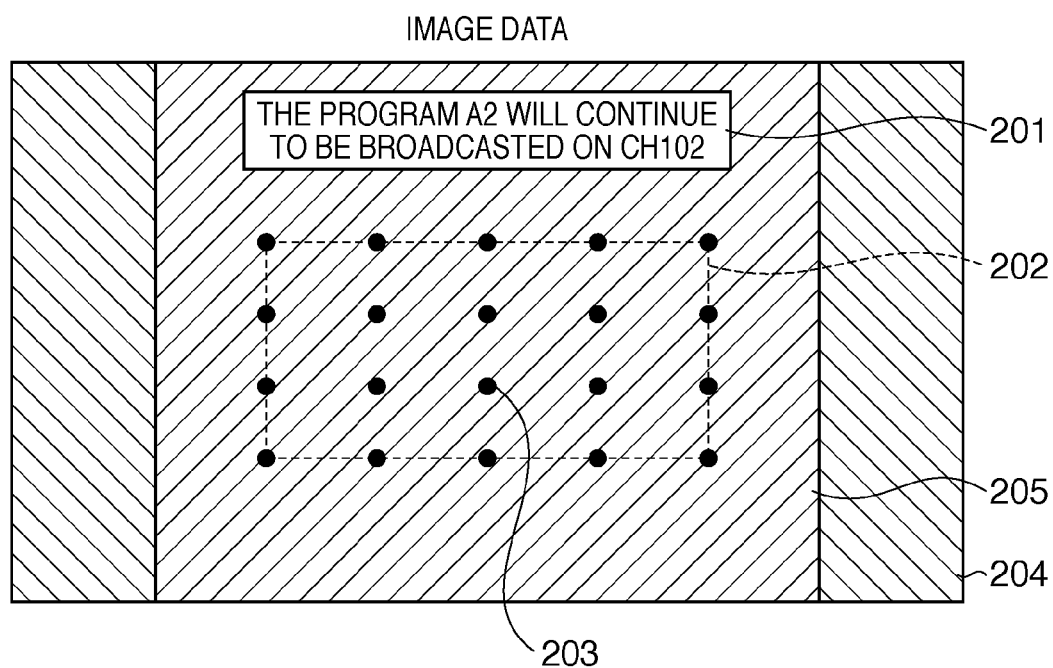
FIG. 4 is a diagram for explaining a sampling region in image comparison carried out by an image comparison unit shown in FIG. 1.

FIG. 4 is a diagram for explaining a sampling region in image comparison carried out by the image comparison unit 108. A message 201 indicating that the event relay will come is displayed a certain period of time before the end time of the relay source program.

For example, as shown in FIG. 2, in a case in which the relay destination program A2 is related to the relay source program A1, the message 201 saying that "the program A2 will continue to be broadcasted on ch102" is displayed when the program A1 on ch101 is being received. On the other hand, the program A2 starts to be broadcasted on ch102 at time t2 before the end time t3 of the program A1. The message 201 described above is not displayed on the broadcasting screen on the ch102. Therefore, when the image comparison unit 108 carries out image comparison, image comparison unit 108 extracts and compares data of sampling regions 202 near the center of the images as examples of regions on which no messages are displayed, rather than the entire images.

The extracted data is pixel data of a plurality of points 203 in the sampling region 202. This pixel data may be the data of one pixel corresponding to the point 203, or data of a plurality of pixels around the point 203. The image comparison unit 108 identifies, as a result of the image comparison, two images which have a higher concordance rate than a predetermined reference value (for example, 90%), as "corresponding images".

For example, in a case in which an event relay is carried out between programs with different resolutions, like a case in which the relay source program is HD (High Definition) whereas the relay destination program is SD (Standard Definition), the image size differs before and after the relay. FIG. 4 shows an image size 204 with the HD and an image size 205 with the SD, where the image size with the HD corresponds to, for example, the number of pixels 1920×1080, whereas the image size with the SD corresponds to, for example, the number of pixels 720×480. In the present embodiment, since data of the sampling region 202 near the center of the image is extracted to compare images, corresponding images can be identified even in the case of carrying out an event relay between programs with different resolutions, as in the case of a relay from a program in HD to a program in SD.

Figure 5:
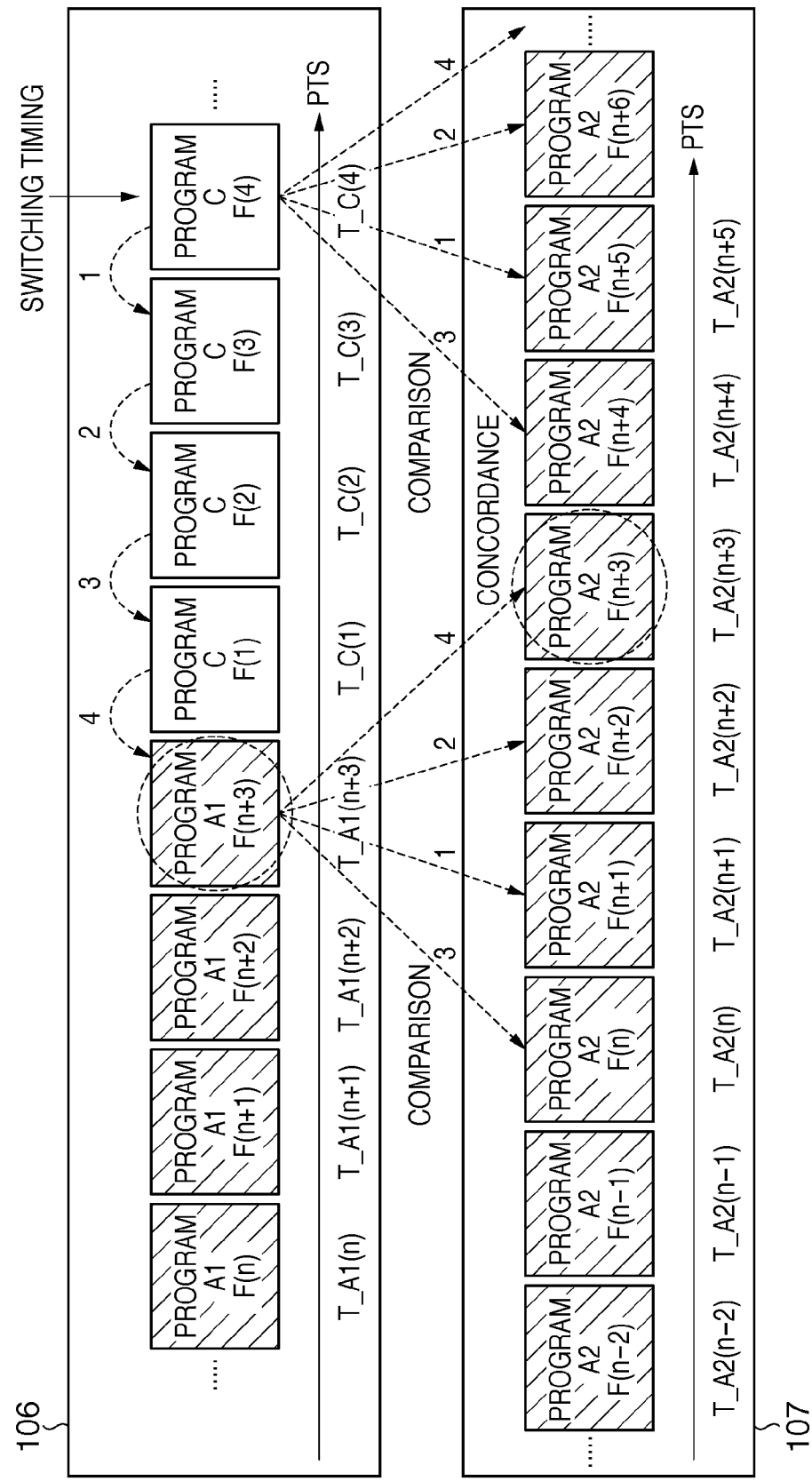
FIG. 5 is a diagram for explaining in detail the operation of image comparison carried out by the image comparison unit.

FIG. 5 is a diagram for explaining in detail the operation of image comparison carried out by the image comparison unit 108. The image comparison unit 108 goes back in terms of time at a predetermined frame interval to compare images sequentially from the image corresponding to end time of the relay source recorded program (switching timing).

As shown in FIG. 5, presentation time stamp (PTS: Presentation Time Stamp) for synchronization is added to images transmitted from the broadcaster. The PTS value is information indicating time (presentation time) at which an image is displayed on the screen.

In addition, the event information table (EIT: Event Information Table) in which the event (program) identification (event_id), start time (start_time), broadcast duration (duration), and the like of each program are described is transmitted from the broadcaster. In current operations, as for the relay source program, the end time (start_time+duration) calculated from the information described in the event information table may be a little later than the actual end time (for example, 3 seconds). This is considered to be because of precision errors of a timer within the TV receiver, as well as delays due to transmission line and delays with decoding. FIG. 5 shows a case in which the switching timing (the end time (start_time+duration) of the program A1) specified by the relay source program A1 corresponds to a timing (timing of PTS=T_C(4)) after starting broadcast of a program C to be next broadcasted on the channel of the program A1.

In this case, the image comparison unit 108 starts image comparison from the image F(4) of the program C corresponding to PTS=T_C(4). In this way, the comparison is started from the image with the PTS value corresponding to the switching timing specified by the relay source program. In this case, the image F(4) of the program C is first compared with an image F(n+5) of the relay destination program A2 which is closest to the image F(4). As a result of the comparison, in a case in which the images are not images which correspond to each other, the image F(4) of the program C is compared with an image F(n+6) of the relay destination program A2 which is next closest to the image F(4). In this way, the image F(4) of the program C is compared with a predetermined number of (for example, four) images of the relay destination program A2, and in a case in which there is no image which corresponds to the image F(4) of the program C, an image F(3) that is one before the image F(4) of the program C is to be then compared with images of the relay destination program A2. Likewise, in a case in which there are no images that correspond to each other even when an image F(2) or F(1) of the program C is compared with images of the relay destination program A2, an image F(n+3) of the program A1 just before the program C is to be then compared with images of the relay destination program A2. Then, as a result of image comparison carried out likewise, images which have a higher concordance rate than a predetermined reference value (for example, 90%) are identified as "corresponding images". FIG. 5 shows a case in which an image F(n+3) of the relay destination program A2 is identified as an image which corresponds to the image F(n+3) of the relay source program A1.

It is to be noted that in a case in which the sizes (the number of pixels) of the two images to be compared are different from each other, the image comparison unit 108 includes a scaler unit for converting the image size. For example, in the case of a relay from a program with HD to a program with SD, the image size of the program with the SD is enlarged to a size corresponding to the HD and compared. Alternatively, the image size of the program with HD may be reduced to a size corresponding to SD and compared.

Returning to FIG. 3B, in step S12, in a case in which two images which correspond to each other are identified as a result of the image comparison, processing proceeds to step S13. In step S13, the control unit 112 switches from the video and/or audio data of the relay source recorded program A1 to the video and/or audio data of the relay destination program A2 at the position of the corresponding images, and controls the apparatus for seamless recording. Specifically, the control unit 112 controls the outputs of the first and second buffers 106 and 107 and controls the operation of the switching unit 109 so that the image F(n+3) of the relay source program A1 and an image F(n+4) of the relay destination program A2 are merged and recorded.

Figure 6:
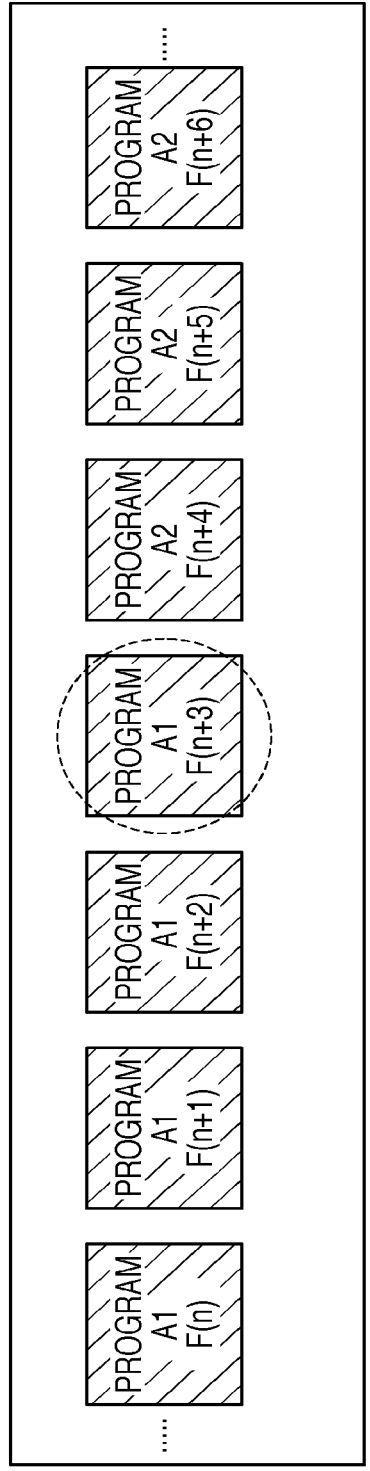
FIG. 6 is a diagram for explaining an image recorded in a storage shown in FIG. 1.

FIG. 6 is a diagram for explaining an image recorded in the storage 110. As shown in FIG. 6, the images up to the image F(n+3) of the relay source program A1, and the image F(n+4) and the following images of the relay destination program A2, are seamlessly recorded on the storage 110. It is to be noted that since the images of the relay destination program A2 are images held in the second buffer 107 once and sequentially read out, video delayed by slight time shift is recorded on the storage 110, rather than real-time broadcast video.

Returning once again to FIG. 3B, in step S14 the control unit 112 stops the receiving operation carried out by the first receiving unit 102, and also stops the operations carried out by the first decoder 104 and the first buffer 106. However, at this point, since the program being received by the second receiving unit 103 is being recorded, the second decoder 105 and the second buffer 107 maintain a state of operation.

Alternatively, in step S12, in a case in which two images which correspond to each other are not identified as a result of the image comparison, processing proceeds to step S15. In step S15, the operations carried out by the first and second buffers 106 and 107 and the switching unit 109 are controlled so as to switch from the video and/or audio data on the relay source channel to the video and/or audio data on the relay destination channel at the position corresponding to the end time of the relay source program A1. However, the image comparison unit 108 may be provided with a function of comparing the images held in the first buffer 106 so that the position of switching from an image of the program A1 to an image of the program C can be detected. In this case, in step S15, switching from the video of the relay source program A1 to the video of the relay destination program A2 is enabled at the position of actual switching from an image of the relay source program A1 to an image of the following program C.

Next, in step S16, when the control unit 112 detects the end time of the relay destination program A2, the control unit 112 controls the apparatus so as to stop the recording operation.

In a conventional broadcast program recording apparatus, however, as described in step S8, channel selection of one receiving unit is controlled so as to switch from the relay source channel to the relay destination channel at the end time of the relay source program. In this case, images are distorted at the channel switching. Further, due to delay (time lag) and the like caused by controlling the channel switching with the use of one tuner, recording of a portion of the program may be missed. Furthermore, due to an inaccurate built-in clock of the broadcast program recording apparatus, the timing of the channel switching may be off. Depending on the timing of the channel switching, the beginning of the next broadcast program may be recorded, thereby missing recording of a portion of the program.

Figure 7:
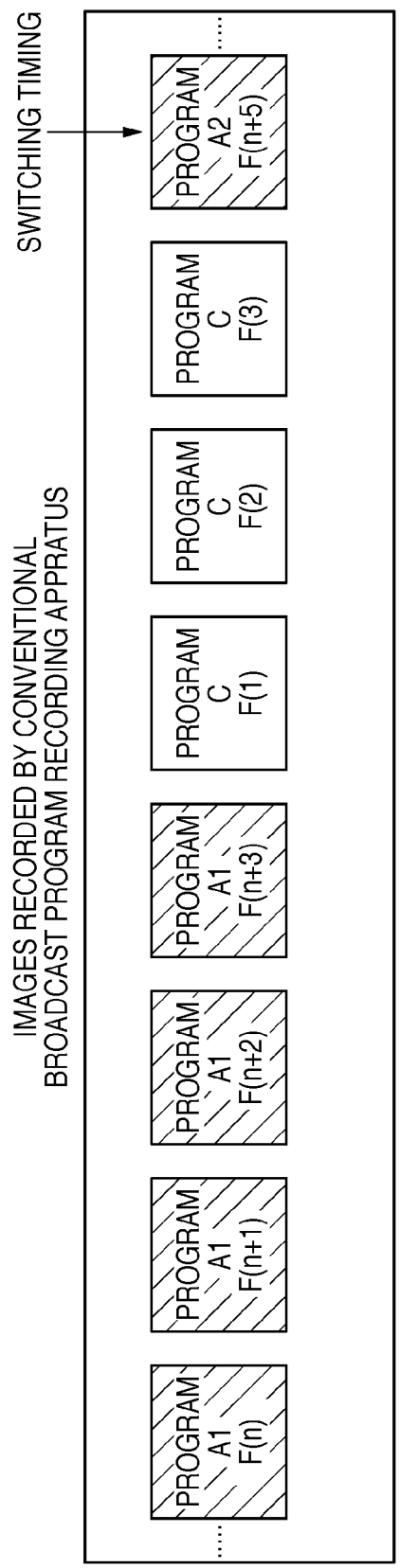
FIG. 7 is a comparative diagram for explaining operation carried out by a conventional broadcast program recording apparatus.

FIG. 7 is a comparative diagram for explaining operation carried out by a conventional broadcast program recording apparatus, where the operation will miss recording a portion of a program. As described with reference to FIG. 5, in a case in which the switching timing specified by the relay source program A1 (the end time (start_time+duration) of the program A1) comes after starting to broadcast the program C, some of the beginning images of the program C will be recorded. Therefore, recording of a portion (the image F(n+4) and the image F(n+5)) of the program A2 will be missed.

By contrast, in Embodiment 1, the images up to the image F(n+3) of the relay source program A1 and the image F(n+4) and the following images of the relay destination program A2 are seamlessly recorded on the storage 110 as described with reference to FIG. 6. Therefore, it is possible to solve the problem that the beginning of the next broadcast program on the channel of the relay source program is recorded at the channel switching in the event relay while recording the beginning of the relay destination program is missed. Further, the period during which the content of the same program is received in parallel by use of the different receiving units prevents distortion of images from being recorded at the channel switching.

As described above, according to Embodiment 1, in recording of an event relayed broadcast program, recording of the program is enabled without missing recording of a portion of the program or distorting recorded video at the channel switching, and seamless recording can be thus achieved.

Modified Example of Embodiment 1

In this modified example of Embodiment 1, after recording a relay source program and a relay destination program once on a storage 110, image comparison is carried out to combine the images while playing back the programs.

Figure 8:
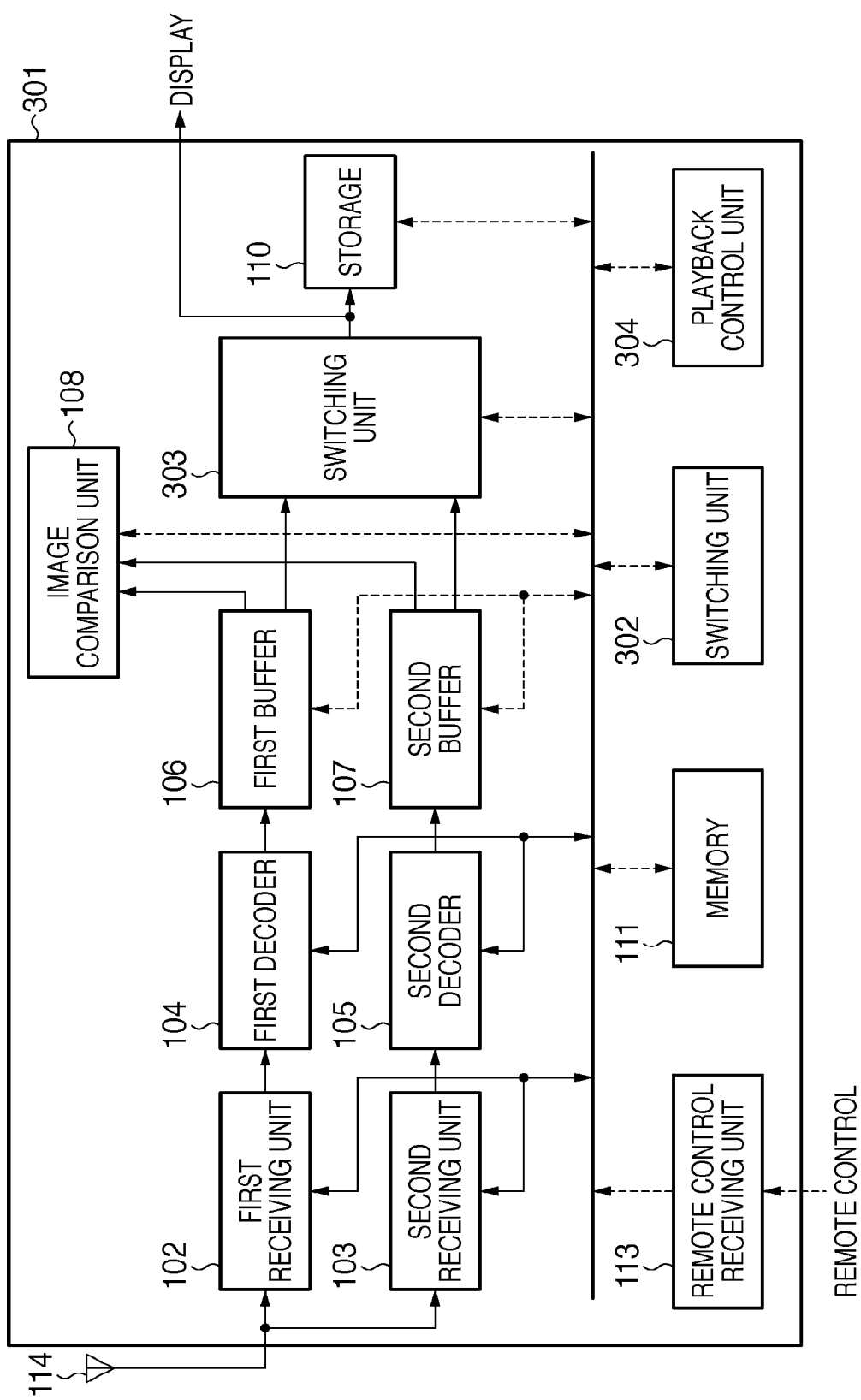
FIG. 8 is a block diagram illustrating a schematic configuration of a broadcast program recording apparatus according to a modified example of Embodiment 1 of the present invention.

FIG. 8 is a block diagram illustrating a schematic configuration of a broadcast program recording apparatus 301 according to the modified example of Embodiment 1. Referring to FIG. 8, FIG. 8 is different from FIG. 1 in that the control unit 112 is replaced by a control unit 302, the switching unit 109 is replaced by a switching unit 303, and a playback control unit 304 is added. It is to be noted that blocks which operate in the same way as those in FIG. 1 are denoted by the same reference numerals in FIG. 8, and overlapping description thereof will be thus omitted.

The broadcast program recording apparatus 301 has a configuration that is capable of recording both video and/or audio data received by a first receiving unit 102 and video and/or audio data received by a second receiving unit 103 at the same time on the storage 110. The switching unit 303 selects and outputs either one or both signals of output signals from first and second buffers 106 and 107.

Figure 9:
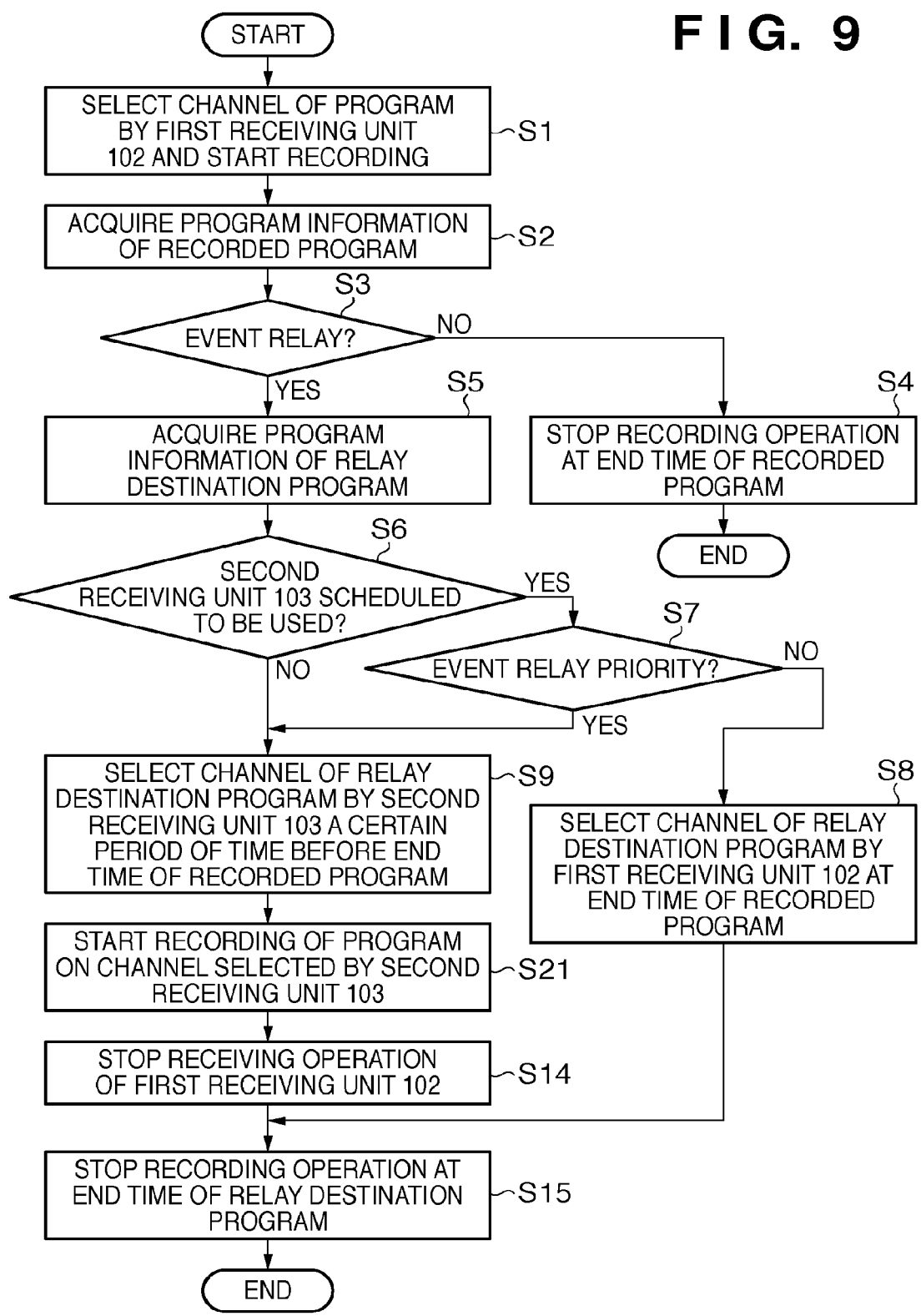
FIG. 9 is a flow chart for explaining recording operation carried out by the broadcast program recording apparatus shown in FIG. 8.

FIG. 9 is a flow chart for explaining recording operation carried out by the broadcast program recording apparatus 301 shown in FIG. 8. Referring to FIG. 9, FIG. 9 is different from FIGS. 3A and 3B in that the operations in steps S10 to S13 of FIGS. 3A and 3B are replaced by step S21.

In step S21, the control unit 302 starts to record a program selected by the second receiving unit 103 on the storage 110 via a second decoder 105, a second buffer 107, and the switching unit 303. However, during the recording, the holding function of the second buffer 107 is turned off, and control is exercised so that the video data and audio data decoded by the second decoder 105 is passed through the second buffer 107 and recorded on the storage 110.

Next, in step S22, the control unit 302 stops the receiving operation carried out by the first receiving unit 102, and also stops the operations carried out by the first decoder 104 and the first buffer 106. However, at this point, since the program being received by the second receiving unit 103 is being recorded, the second decoder 105 and the second buffer 107 keep operating. Then, in step S16, when the control unit 302 detects the end time of the relay destination program, the control unit 302 controls the apparatus so as to stop the recording operation.

Figure 10:
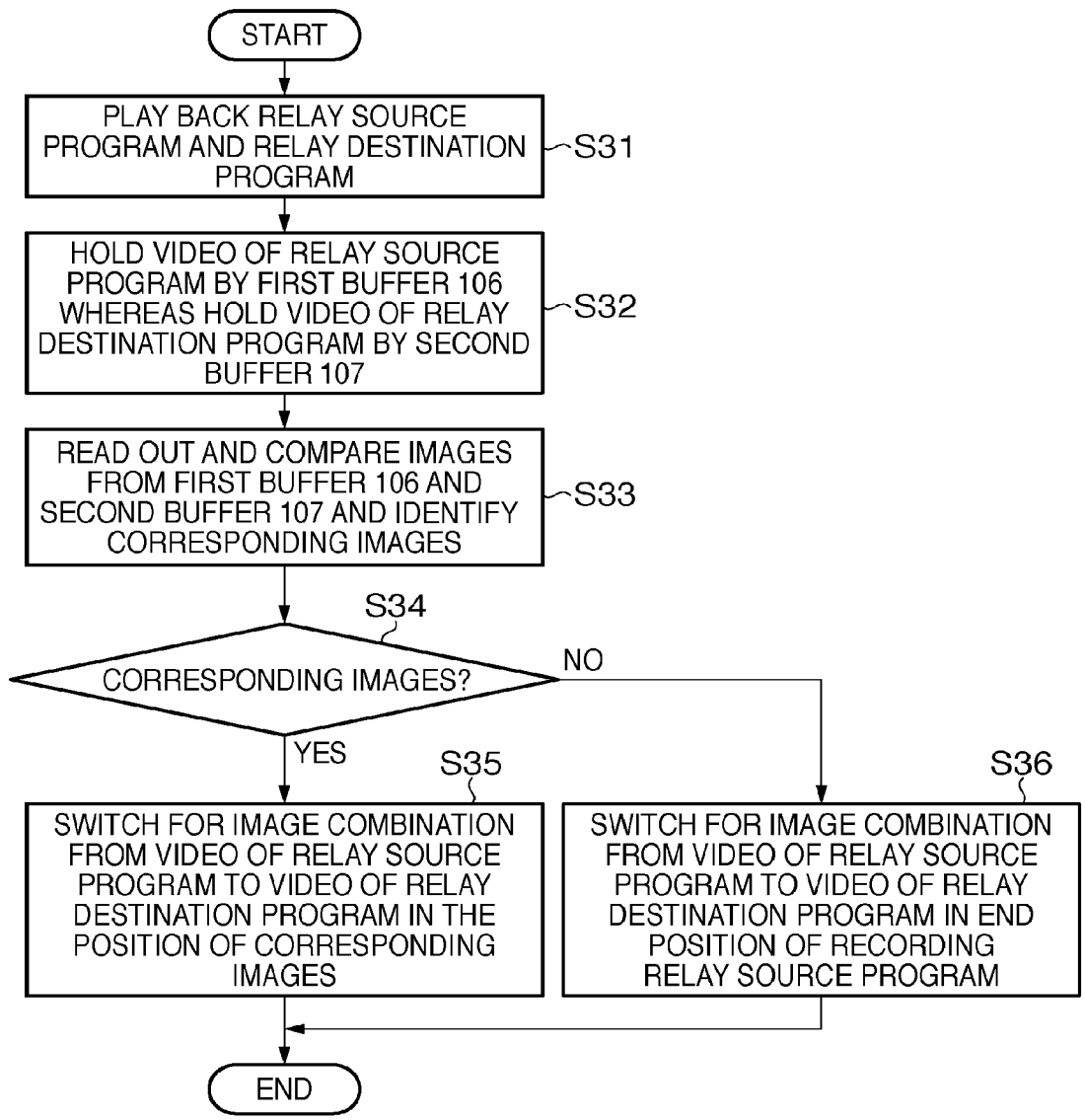
FIG. 10 is a flow chart for explaining playback operation carried out by a playback control unit shown in FIG. 8.

FIG. 10 is a flow chart for explaining playback operation carried out by the playback control unit 304 shown in FIG. 8. In step S31, at the time when the operation of recording the relay destination program is completed, the playback control unit 304 reads out the relay source program and the relay destination program from the storage 110, and plays back the programs. However, the relay source program is played back from the image a predetermined period of time (for example, 10 seconds) before the end time of the recording, whereas the relay destination program is played back from the beginning.

In a case in which the user is viewing the program or programmed recording is executed, the playback operation may be started after the viewing or recording operation is completed and the first and second decoders 104 and 105 are in an unused state.

Next, in step S32, the control unit 302 controls the first buffer 106 and the second buffer 107 so that the first buffer 106 temporarily holds the video and/or audio data of the relay source program whereas the second buffer 107 temporarily holds the video and/or audio data of the relay destination program. Then, in step S33, the control unit 302 controls the image comparison unit 108 so that the image comparison unit 108 carries out an image comparison operation. The image comparison unit 108 reads out and compares the images held in the first and second buffers 106 and 107, and identifies two images that correspond to each other, based on the comparison results.

In step S34, in a case in which two images which correspond to each other are identified as a result of the image comparison, processing proceeds to step S35. In step S35, the control unit 302 switches from the video and/or audio data of the relay source program to the video and/or audio data of the relay destination program in the position of the corresponding images, and controls the apparatus for seamless recording. Specifically, the control unit 302 controls the outputs of the first and second buffers 106 and 107 and controls the operation of the switching unit 303 so that the image F(n+3) of the relay source program A1 and an image F(n+4) of the relay destination program A2 are merged and recorded.

Alternatively, in step S33, in a case in which two images which correspond to each other are not identified as a result of the image comparison, processing proceeds to step S36. In step S36, the outputs of the first and second buffers 106 and 107 and the operation carried out by the switching unit 109 are controlled so as to switch from the video and/or audio data of the relay source program to the video and/or audio data of the relay destination program at the end position of recording the relay source program. As a result, the relay source program and the relay destination program are combined and recorded on the storage 110.

Accordingly, in the modified example of Embodiment 1, as in Embodiment 1, in recording of an event relayed broadcast program, recording of the program is enabled without missing recording of a portion of the program or distorting recorded video at the channel switching, and seamless recording can be thus achieved.

Although the modified example here describes a case in which the signals decoded by the first and second decoders 104 and 105 are recorded on the storage 110, alternatively a transport stream of signals generated by the first and second receiving units 102 and 103 may be recorded on the storage 110. In this case, the playback control unit 304 reads out the transport stream from the storage 110, and plays back the transport stream. Then, the control unit 302 controls the apparatus so that the transport stream played back is separated by the first and second receiving units 102 and 103 into video signals, audio signals, and data signals, and decoded by the first and second decoders 104 and 105.

Embodiment 2

A broadcast program recording apparatus according to Embodiment 2 has the same configuration as that shown in FIG. 1. However, the broadcast program recording apparatus differs in the operation of image comparison carried out by the image comparison unit 108.

Figure 11:
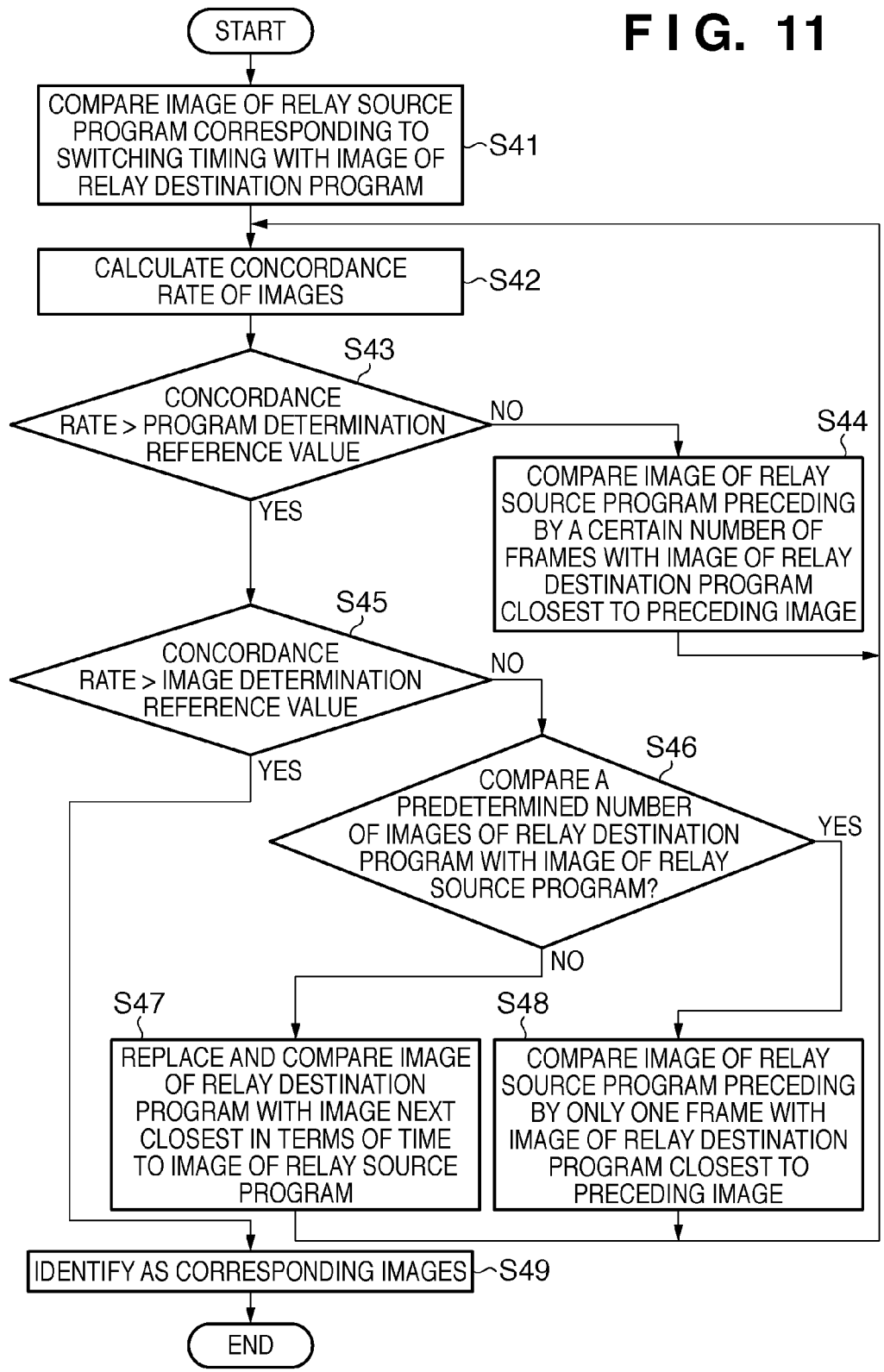
FIG. 11 is a flow chart for explaining a procedure of image comparison in Embodiment 2 of the present invention.
Figure 12:
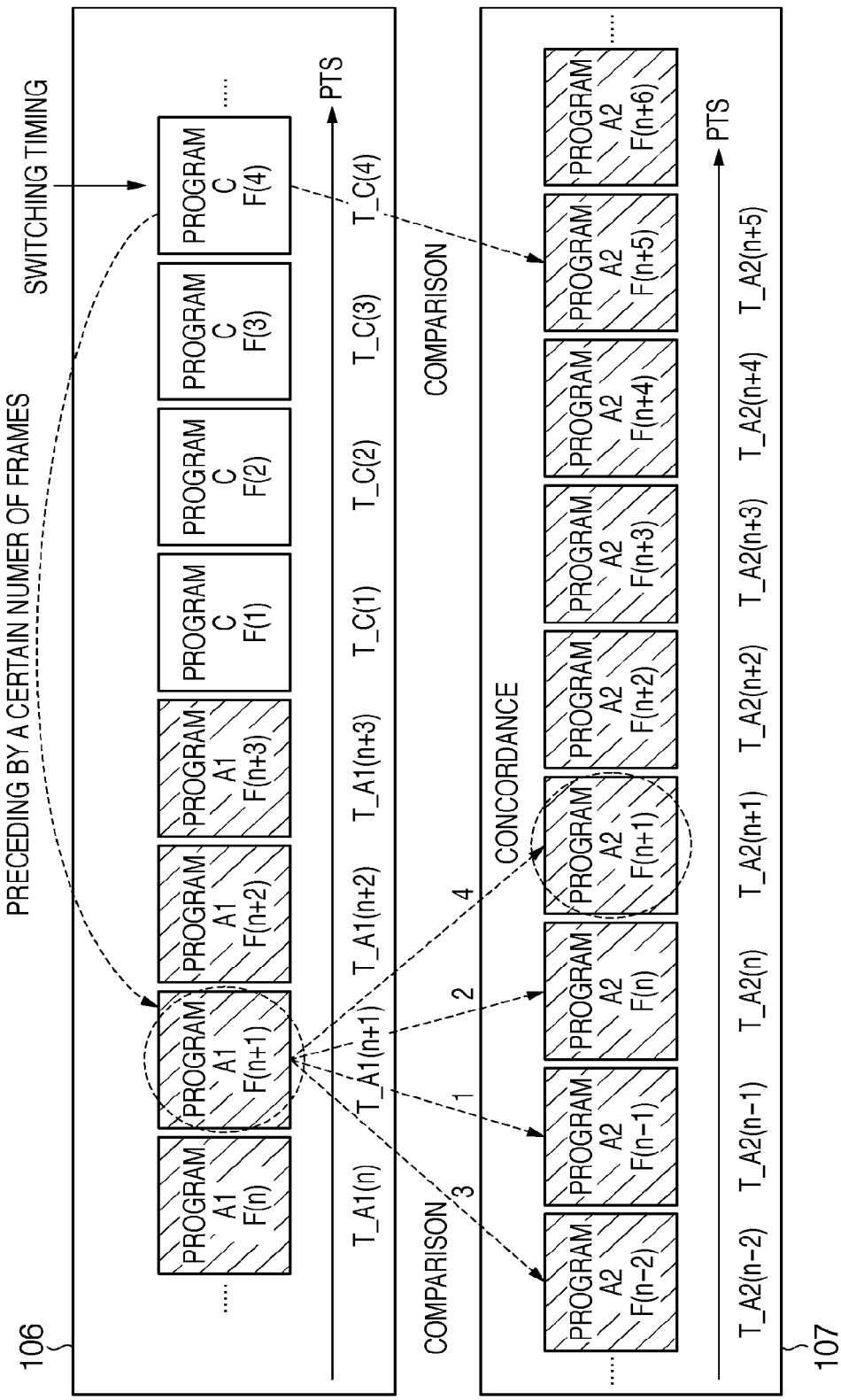
FIG. 12 is a diagram for explaining in detail the operation of image comparison in Embodiment 2 of the present invention.

FIG. 11 is a flow chart for explaining a procedure of image comparison in Embodiment 2. Further, FIG. 12 is a diagram for explaining in detail the operation of image comparison in Embodiment 2. FIG. 12 shows, as in FIG. 5, a case in which the switching timing (the end time (start_time+duration) of the program A1) specified in the relay source program A1 corresponds to a timing (timing of PTS=T_C(4)) after starting broadcast of a program C to be next broadcasted on the channel of the program A1. A description will be given below with reference to FIGS. 11 and 12.

In step S41, the image comparison unit 108 starts image comparison from an image with a PTS value corresponding to the end time (switching time) of the relay source program A1, that is, the image F(4) of the program C corresponding to PTS=T_C(4). At this point, the image F(4) of the program C is compared with the image F(n+5) of the relay destination program A2 which is closest to the image F(4). Then, in step S42, the concordance rate of the compared images is calculated. Next, in step S43, the image comparison unit 108 determines whether or not the concordance rate is greater than a predetermined program determination reference value, that is, whether or not the two compared images are images of the event relayed program which are related to each other. In a case in which an image of the relay source program is compared with an image of the relay destination program, it is assumed that a certain level of high concordance rate is obtained as long as the images are contained in the same scene even if the compared frames are a little off.

FIG. 13 is a diagram showing examples of the determination reference value for the concordance rate of compared images. Referring to FIG. 13, when the relay source program and the relay destination program are both HD (the number of pixels: 1920×1080), the program determination reference value is set at 60%. When the relay source program and the relay destination program are both SD (the number of pixels: 720×480), the program determination reference value is set at 55%. When one of the relay source program and the relay destination program is SD whereas the other is HD, the program determination reference value is set at 50%. Since HD has higher image quality as compared with SD, it is preferable to set different reference values depending on the difference in combination of the image qualities (the numbers of pixels) as described above. In FIG. 13, higher determination reference values are set in the case of the combinations of the same image qualities than in the combinations of the different image qualities.

In step S43, in a case in which it is determined that the concordance rate of images is equal to or less than a predetermined program determination reference value, processing proceeds to step S44 in which the image of the relay source program is replaced with an image preceding by a certain number of frames (for example, 6 frames), and the preceding image is compared with the video of the relay destination program which is closest to the preceding image. Then, the operations in steps S42 to S44 are repeated until the concordance rate of images is greater than the predetermined program determination reference value. In the example shown in FIG. 12, since the image F(4) of the program C differs significantly from the image F(n+5) of the relay destination program A2, the image (the image F(n+1) of the program A1) preceding the image F(4) of the program C by 6 frames is to be compared. Then, the image F(n+1) of the program A1 is compared with the closest image F(n−1) of the relay destination program A2.

Next, in step S45, the image comparison unit 108 determines whether or not the concordance rate of images is greater than a predetermined image determination reference value. FIG. 13 also shows examples of the image determination reference value. Referring to FIG. 13, when the relay source program and the relay destination program are both HD (the number of pixels: 1920×1080), the image determination reference value is set at 90%. When the relay source program and the relay destination program are both SD (the number of pixels: 720×480), the image determination reference value is set at 85%. When one of the relay source program and the relay destination program is SD whereas the other is HD, the image determination reference value is set at 80%. Since HD has higher image quality as compared with SD, it is preferable to set different reference values depending on the difference in combination of the image qualities (the numbers of pixels) as described above. In FIG. 13, higher determination reference values are set in the case of the combinations of the same image qualities than in the combinations of the different image qualities. It is to be noted that the determination reference values shown in FIG. 13 are stored in the memory 111 shown in FIG. 1.

In step S45, in a case in which it is determined that the concordance rate of compared images is equal to or less than a predetermined image determination reference value, processing proceeds to step S46. In step S46, the image comparison unit 108 determines whether or not one image of the relay source program has been compared with a predetermined number of (for example, four) images of the relay destination program. At this point, in a case in which the predetermined number has not been reached, processing proceeds to step S47 in which the image of the relay source program is compared with an image of the relay destination program which is next closest in terms of time to the image of the relay source program, and then returns to step S42. Then, the operations in steps S42 to S47 are repeated until the concordance rate of images is greater than the predetermined image determination reference value. In the example shown in FIG. 12, the image F(n+1) of the relay source program A1 is compared with the image F(n) of the relay destination program A2 which is next closest to the image F(n+1), then compared with the image F(n−2) of the program A2, and then compared with the image F(n+1) thereof. Since the concordance rate of the image F(n+1) of the program A1 and the image F(n+1) of the program A2 is greater than the image determination reference value, processing proceeds from step S45 to step S49.

In a case in which the concordance rate is not greater than the image determination reference value even after the operations in steps S42 to S47 are repeated to compare the compared image of the relay source with a predetermined number of (for example, four) images of the relay destination, processing proceeds from step S46 to step S48. In step S48, a one-frame preceding image of the relay source program is compared with the image of the relay destination which is closest to the preceding image, and the operations in steps S42 to S48 are then repeated.

In a case in which processing proceeds from step S45 to step S49, the compared images determined to have a concordance rate greater than the image determination reference value are identified as "corresponding images". In the example shown in FIG. 12, the image F(n+3) of the relay destination program A2 is identified as an image which corresponds to the image F(n+3) of the relay source program A1.

As described above, in Embodiment 2, the image comparison unit 108 has the function of determining whether or not the two images correspond to images of the event relayed program which are related to each other. Further, in a case in which it is determined that the two images do not correspond to the related event relayed program, image comparison goes back in terms of time at a predetermined frame interval. Therefore, the time required for the corresponding image to be identified is reduced as compared with Embodiment 1. Further, the program determination reference value and the image determination reference are provided which vary depending on the difference in combination of the image qualities (the numbers of pixels) of the compared images, thereby allowing the corresponding images to be identified with a higher degree of accuracy.

Modified Example of Embodiment 2

Figure 14:
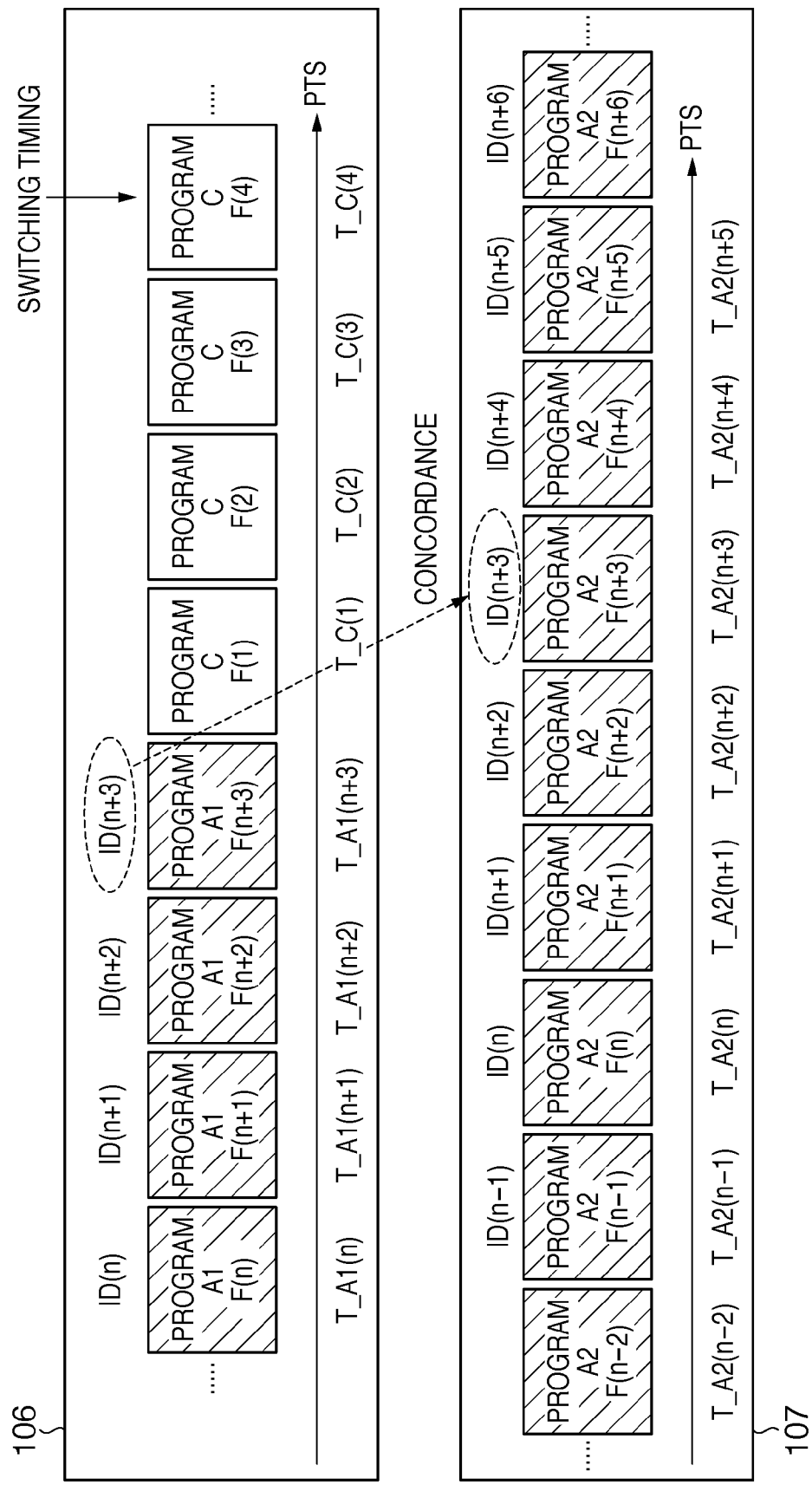
FIG. 14 is a diagram illustrating a modified example of Embodiment 2 of the present invention.

FIG. 14 is a diagram illustrating a modified example of Embodiment 2. In a case in which an ID is assigned to an image transmitted from the broadcaster for each frame, the image comparison unit 108 compares the ID of an image of the relay source program A1 with the ID of an image of the relay destination program A2. Then, corresponding images can be identified by searching images with IDs corresponding to each other. In this case, the time required for corresponding images to be identified can be significantly reduced.

Embodiment 3

Figure 15:
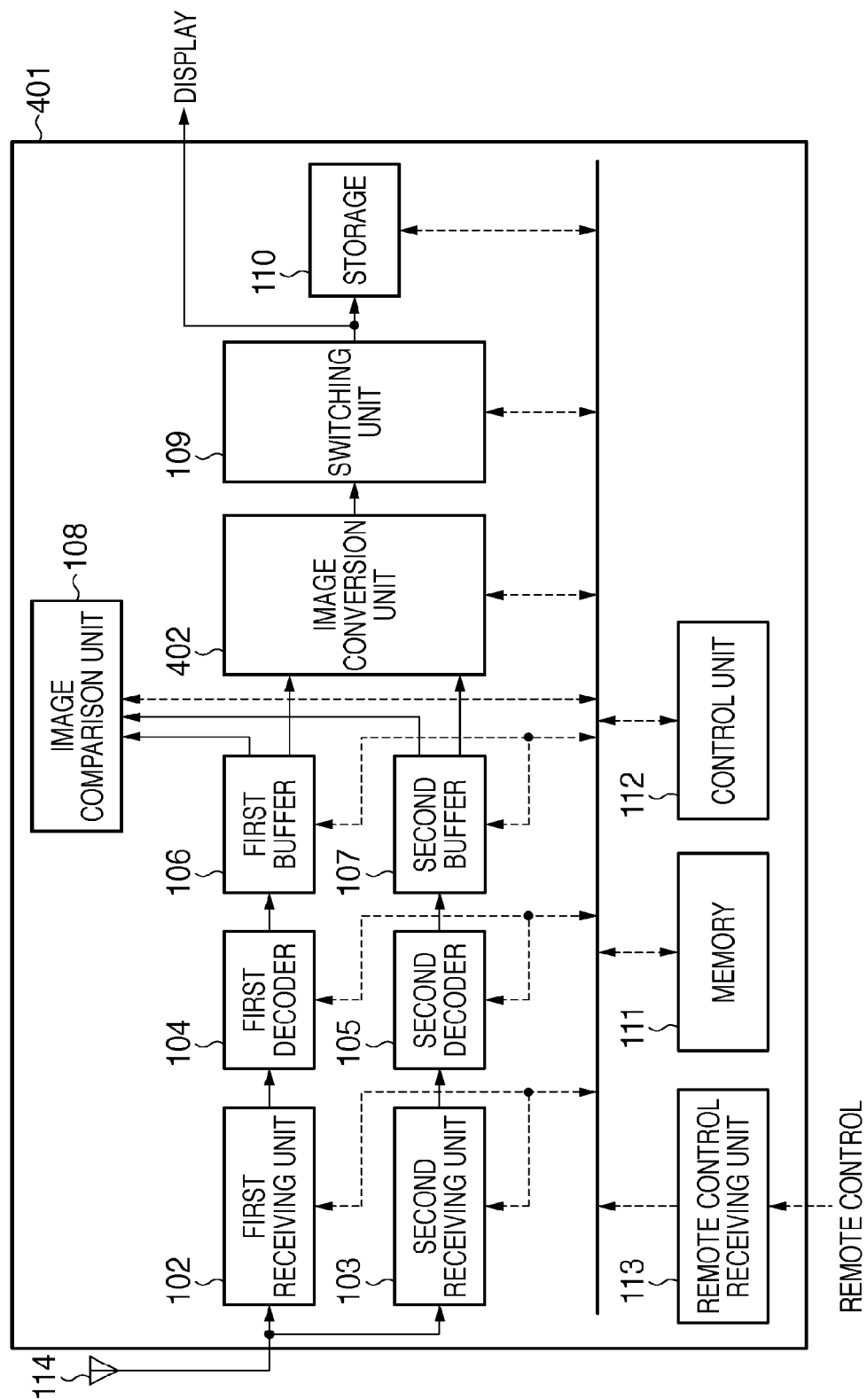
FIG. 15 is a block diagram illustrating a schematic configuration of a broadcast program recording apparatus according to Embodiment 3 of the present invention.

FIG. 15 is a block diagram illustrating a schematic configuration of a broadcast program recording apparatus 401 according to Embodiment 3. Referring to FIG. 15, FIG. 15 is different from FIG. 1 in that a pixel conversion unit 402 is added. It is to be noted that blocks which operate in the same way as those in FIG. 1 are denoted by the same reference numerals in FIG. 15, and overlapping description thereof will be thus omitted.

The pixel conversion unit (scaler) 402 converts, in a case in which the numbers of pixels output from the first and second buffers 106 and 107 are different from each other, either one of the numbers of pixels. FIG. 16 is a diagram for explaining the number of pixels being converted by the pixel conversion unit 402. For example, in the case of a relay from a program with HD to a program with SD, the number of pixels (720×480) of an SD image 501 is converted to the number of pixels (1620×1080) to obtain an image 503 corresponding to the number of pixels (1920×1080) of an HD image 502.

Accordingly, in addition to the advantageous effects of Embodiments 1 and 2, in Embodiment 3, even in the case of an event relay between programs between which the number of pixels varies, video can be recorded with a sense of discomfort reduced at the channel switching in the event relay.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-1783985, filed on Jul. 6, 2007, which is hereby incorporated by reference herein its entirety.

The invention claimed is:

1. A broadcast program recording apparatus comprising:
   a first receiver and a second receiver respectively configured to receive video data of a broadcast program;
   a storage medium that is capable of recording video data received by the first and second receivers; and
   a controller configured to:
      determine whether or not video data being received by the first receiver is video data of a relayed program that is composed of a relay source program broadcasted on a first channel and a relay destination program broadcasted on a second channel that is different from the first channel, and that is broadcasted continuously from the first channel to the second channel with a predetermined length of an overlapped period of the relay source program and the relay destination program in which the same contents are broadcasted on both the first channel and the second channel, and control the second receiver so that video data on the second channel is received by the second receiver and recorded on the storage medium a predetermined time before an end time of the relay source program, in a case in which it is determined that the video data on the first channel is video data of the relayed program when the video data on the first channel is received by the first receiver and recorded on the storage medium.

2. The broadcast program recording apparatus according to claim 1, further comprising:
a first buffer configured to temporarily hold images on the first channel received by the first receiver; and
a second buffer configured to temporarily hold images on the second channel received by the second receiver,
wherein the controller is further configured to:
compare the images held in the first buffer with the images held in the second buffer
identifying identify two images which correspond to each other, based on a result of comparing the images, and
perform control so that the video data on the first channel and the video data on the second channel are merged at the two identified images and recorded on the storage medium.

3. The broadcast program recording apparatus according to claim 2, wherein two compared images are identified as the two images which correspond to each other in a case in which the two compared images have a concordance rate greater than a predetermined reference value.

4. The broadcast program recording apparatus according to claim 2, wherein the controller is further configured to go back in terms of time at a predetermined interval to compare images in a plurality of frames held in the first buffer sequentially from an image in a frame corresponding to the end time of the relay source recorded program.

5. The broadcast program recording apparatus according to claim 2, wherein the controller is further configured to:
determine that two compared images are images of the relayed program in a case in which the two compared images have a concordance rate greater than a predetermined reference value, and
carry out an operation for identifying the two images which correspond to each other in a case in which it is determined that that the images are images of the relayed program.

6. The broadcast program recording apparatus according to claim 1, further comprising:
a playback controller configured to play back the video data on the first channel and the video data on the second channel, the video data on both the first channel and the second channel being recorded on the storage medium;
a first buffer configured to hold images on the first channel, the images being played back by the playback control unit; and
a second buffer configured to hold images on the second channel, the images being played back by the playback control unit, wherein the controller is further configured to:
compare the images held in the first buffer with the images held in the second buffer; and
identify two images which correspond to each other, based on a comparison result, and
perform control so that the video data on the first channel and the video data on the second channel are merged at the two identified images and then recorded on the storage medium.

7. The broadcast program recording apparatus according to claim 1, further comprising a pixel converter configured to convert a number of pixels of video data received by either the first receiver or the second receiver in a case in which the number of pixels of the video data on the first channel received by the first receiver is different from the number of pixels of the video data on the second channel received by the second receiver.

8. A control method for a broadcast program recording apparatus having a first receiver and a second receiver respectively configured to receive video data of a broadcast program, the method comprising:
recording, on a storage medium, video data on a first channel received by the first receiver;
determining whether or not video data being received by the first receiver is video data of a relayed program that is composed of a relay source program broadcasted on a first channel and a relay destination program broadcasted on a second channel that is different from the first channel, and that is broadcasted continuously from the first channel to the second channel with a predetermined length of an overlapped period of the relay source program and the relay destination program in which the same contents are broadcasted on both the first channel and the second channel; and
performing control so that video data on the second channel is received by the second receiver and recorded on the storage medium a predetermined time before an end time of the relay source program, in a case in which it is determined that the video data on the first channel is video data of the relayed program.

9. The control method according to claim 8, further comprising:
temporarily holding, in a first buffer, images on the first channel received by the first receiver and temporarily holding, in a second buffer, images on the second channel received by the second receiver;
comparing the images held in the first buffer with the images held in the second buffer;
identifying two images which correspond to each other, based on a result of comparing the images; and
performing control so that the relay source program and the relay destination program are merged at the two identified images and recorded on the storage medium.

10. The control method according to claim 9, wherein two compared images are identified as the two images which correspond to each other in a case in which the two compared images have a concordance rate greater than a predetermined reference value.

11. The control method according to claim 9, wherein, by going back in terms of time at a predetermined interval, images in a plurality of frames held in the first buffer are compared sequentially from an image in a frame corresponding to the end time of the relay source recorded program.

12. The control method according to claim 9, further comprising determining that two compared images are images of the relayed program in a case in which the two compared images have a concordance rate greater than a predetermined reference value, wherein an operation for identifying the two images which correspond to each other is carried out in a case in which it is determined that the images are images of the relayed program.

13. The control method according to claim 8, further comprising:

playing back the video data on the first channel and the video data on the second channel, wherein the video data on both the first channel and the second channel is recorded on the storage medium;

temporarily holding in a first buffer images on the first channel, the played back images, and temporarily holding in a second buffer images on the second channel, the played back images;

comparing the images held in the first buffer with the images held in the second buffer;

identifying two images which correspond to each other, based on a result of comparing the images; and performing control so that the relay source program and the relay destination program that are played back are merged at the two identified images and then recorded on the storage medium.

14. The control method according to claim 8, further comprising converting a number of pixels of video data received by either the first receiver or the second receiver, in a case in which the number of pixels of the video data on the first channel received by the first receiver is different from the number of pixels of the video data on the second channel received by the second receiver.

\* \* \* \* \*